US012613375B2

(12) United States Patent
Toda et al.

(10) Patent No.: US 12,613,375 B2
(45) Date of Patent: Apr. 28, 2026

(54) COATING REMOVAL TOOL

(71) Applicant: SUMITOMO ELECTRIC OPTIFRONTIER CO., LTD., Yokohama (JP)

(72) Inventors: Yoshinobu Toda, Yokohama (JP); Hiroshi Nakamura, Yokohama (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 806 days.

(21) Appl. No.: 17/770,124

(22) PCT Filed: Oct. 19, 2020

(86) PCT No.: PCT/JP2020/039266

§ 371 (c)(1),
(2) Date: Apr. 19, 2022

(87) PCT Pub. No.: WO2021/106428

PCT Pub. Date: Jun. 3, 2021

(65) Prior Publication Data

US 2022/0365279 A1 Nov. 17, 2022

(30) Foreign Application Priority Data

Nov. 26, 2019 (JP) ................................. 2019-213574

(51) Int. Cl.
*G02B 6/245* (2006.01)
(52) U.S. Cl.
CPC .................................. *G02B 6/245* (2013.01)
(58) Field of Classification Search
CPC ..... G02B 6/245; H02G 1/1209; H02G 1/1275
See application file for complete search history.

(56) References Cited

U.S. PATENT DOCUMENTS 5,893,302 A * 4/1999 Strom .................. G02B 6/4498
81/9.41
6,478,481 B2 * 11/2002 Uchida ................ G02B 6/2551
385/96
(Continued)

FOREIGN PATENT DOCUMENTS

CN 102692676 A 9/2012
CN 106646741 A * 5/2017 ............. G02B 6/245
(Continued)

OTHER PUBLICATIONS

English language translation of JP H02199410 A to Sasaki et al. obtained from https://worldwide.espacenet.com/ on Sep. 15, 2025.*

(Continued)

*Primary Examiner* — Evan H Macfarlane
(74) *Attorney, Agent, or Firm* — Oliff PLC

(57) ABSTRACT

A coating removal tool removes a resin coating positioned at a distal end portion of a coated optical fiber. The coating removal tool includes a first holding part holding the resin coating positioned at the distal end portion, a second holding part configured to hold a base end portion of the coated optical fiber adjacent to the distal end portion, and a pedestal part configured to support the first holding part and the second holding part. The first holding part includes a heater for heating the resin coating positioned at the distal end portion and a blade for making a notch in the resin coating, and is provided to be slidable relative to the pedestal part. The second holding part is fixed relative to the pedestal part.

6 Claims, 6 Drawing Sheets

(56) References Cited

U.S. PATENT DOCUMENTS

| | | | | |
|---|---|---|---|---|
| 2008/0282522 A1* | 11/2008 | Song | ................... | G02B 6/2553 |
| | | | | 219/148 |
| 2018/0267242 A1 | 9/2018 | Kanda et al. | | |
| 2018/0272550 A1 | 9/2018 | Sakanishi | | |
| 2018/0275345 A1* | 9/2018 | Kawanishi | ............. | G02B 6/566 |

FOREIGN PATENT DOCUMENTS

| | | | | |
|---|---|---|---|---|
| JP | 863-057601 | U | | 4/1988 |
| JP | H01-090003 | U | | 6/1989 |
| JP | H02-003502 | U | | 1/1990 |
| JP | H02199410 | A | * | 8/1990 |
| JP | 2000-193828 | A | | 7/2000 |
| JP | 2003-050320 | A | | 2/2003 |
| JP | 2003-270450 | A | | 9/2003 |
| JP | 2003337227 | A | * | 11/2003 |
| JP | 2009-506348 | A | | 2/2009 |
| JP | 2011-197083 | A | | 10/2011 |
| JP | 2015-184647 | A | | 10/2015 |
| JP | 2018-138970 | A | | 9/2018 |
| JP | 2018-151433 | A | | 9/2018 |
| WO | 2006/112675 | A1 | | 10/2006 |

OTHER PUBLICATIONS

English language translation of JP 2003270450 A to Furukawa Electric Co. obtained from https://worldwide.espacenet.com/ on Sep. 16, 2025.*

Dec. 8, 2020 Search Report issued in International Patent Application No. PCT/JP2020/039266.

* cited by examiner

COATING REMOVAL TOOL

TECHNICAL FIELD

The present disclosure relates to a coating removal tool. This applicaction claims priority from Japanese Patent Application No. 2019-213574 filed on Nov. 26, 2019, the entire contents of which are incorporated herein by reference.

BACKGROUND ART

Patent Literature 1 discloses a coating removal tool. This coating removal tool includes a main body part and an optical fiber holder holding part. The main body part includes an optical fiber placing part and a lid part. A coated optical fiber having a glass fiber and a coating part that covers the glass fiber is placed on the optical fiber placing part. The optical fiber placing part includes a first cutting blade that cuts the coating part. The lid part is provided to be openable and closable with respect to the optical fiber placing part. The lid part includes a second cutting blade. When the lid part is closed with respect to the optical fiber placing part, the second cutting blade faces the first cutting blade. The optical fiber holder holding part holds an optical fiber holder that holds the coated optical fiber. The optical fiber holder holding part is connected to one end of the main body part and is provided to be slidable in directions toward and away from the main body part.

Patent Literature 2 discloses a coating removal device. This coating removal device includes a main body, a holding part, and a sliding part. The main body includes a blade for removing the coating. The holding part holds an optical fiber. The sliding part connects the main body and the holding part such that they are able to come closer to and separate from each other. The coating removal device removes the coating of the optical fiber by making a notch in the coating of the optical fiber with the blade and then separating the main body and the holding part from each other.

CITATION LIST

Patent Literature

[Patent Literature 1] Japanese Unexamined Patent Publication No. 2015-184647
[Patent Literature 2] Japanese Unexamined Patent Publication No. 2018-151433

SUMMARY OF INVENTION

A coating removal tool according to one embodiment of the present disclosure removes a portion of a resin coating positioned at a distal end portion of a coated optical fiber from the coated optical fiber having a glass fiber and a resin coating that covers an outer circumference of the glass fiber. The coating removal tool includes a first holding part, a second holding part, and a pedestal part. The first holding part holds the portion of the resin coating positioned at the distal end portion. The second holding part is disposed in an extending direction of the coated optical fiber with respect to the first holding part and holds a base end portion of the coated optical fiber adjacent to the distal end portion. The pedestal part is provided in a direction intersecting the extending direction of the coated optical fiber with respect to the first holding part and the second holding part. The pedestal part supports the first holding part and the second holding part. The first holding part includes a heater for heating the portion of the resin coating positioned at the distal end portion, and a blade for making a notch in a portion of the resin coating positioned at a boundary between the distal end portion and the base end portion. The first holding part is provided to be slidable in the extending direction of the coated optical fiber relative to the pedestal part. The second holding part is fixed relative to the pedestal part.

A coating removal tool according to another embodiment of the present disclosure removes portions of resin coatings positioned at distal end portions of a first coated optical fiber and a second coated optical fiber from the first coated optical fiber and the second coated optical fiber each having a glass fiber and a resin coating that covers an outer circumference of the glass fiber. The coating removal tool includes a first holding part, a second holding part, a third holding part, and a pedestal part. The first holding part holds the portion of the resin coating positioned at the distal end portion of the first coated optical fiber extending from one side in a predetermined direction, or the portion of the resin coating positioned at the distal end portion of the second coated optical fiber extending from another side in the predetermined direction. The second holding part is disposed on one side in the predetermined. direction with respect to the first holding part. The second holding part holds a base end portion of the first coated. optical fiber adjacent to the distal end portion. The third holding part is disposed on another side in the predetermined direction with respect to the first holding part. The third holding part holds the base end portion of the second coated optical fiber adjacent to the distal end portion. The pedestal part is provided in a direction intersecting the predetermined direction with respect to the first holding part, the second holding part, and the third holding part. The pedestal part supports the first holding part, the second holding part, and the third holding part, The first holding part includes a heater, a first blade, and a second blade. The heater heats the portions of the resin coatings positioned at the distal end portions of the first coated optical fiber and the second coated. optical fiber. The first blade makes a notch in a portion of the resin coating positioned at a boundary between the distal end portion and the base end portion of the first coated optical fiber. The second blade makes a notch in a portion of the resin coating positioned at a boundary between the distal end portion and the base end portion of the second coated optical fiber. The first holding part is provided to be slidable in the predetermined direction relative to the pedestal part. The second holding part and the third holding part are fixed relative to the pedestal part.

DESCRIPTION OF EMBODIMENTS

Figure 1:
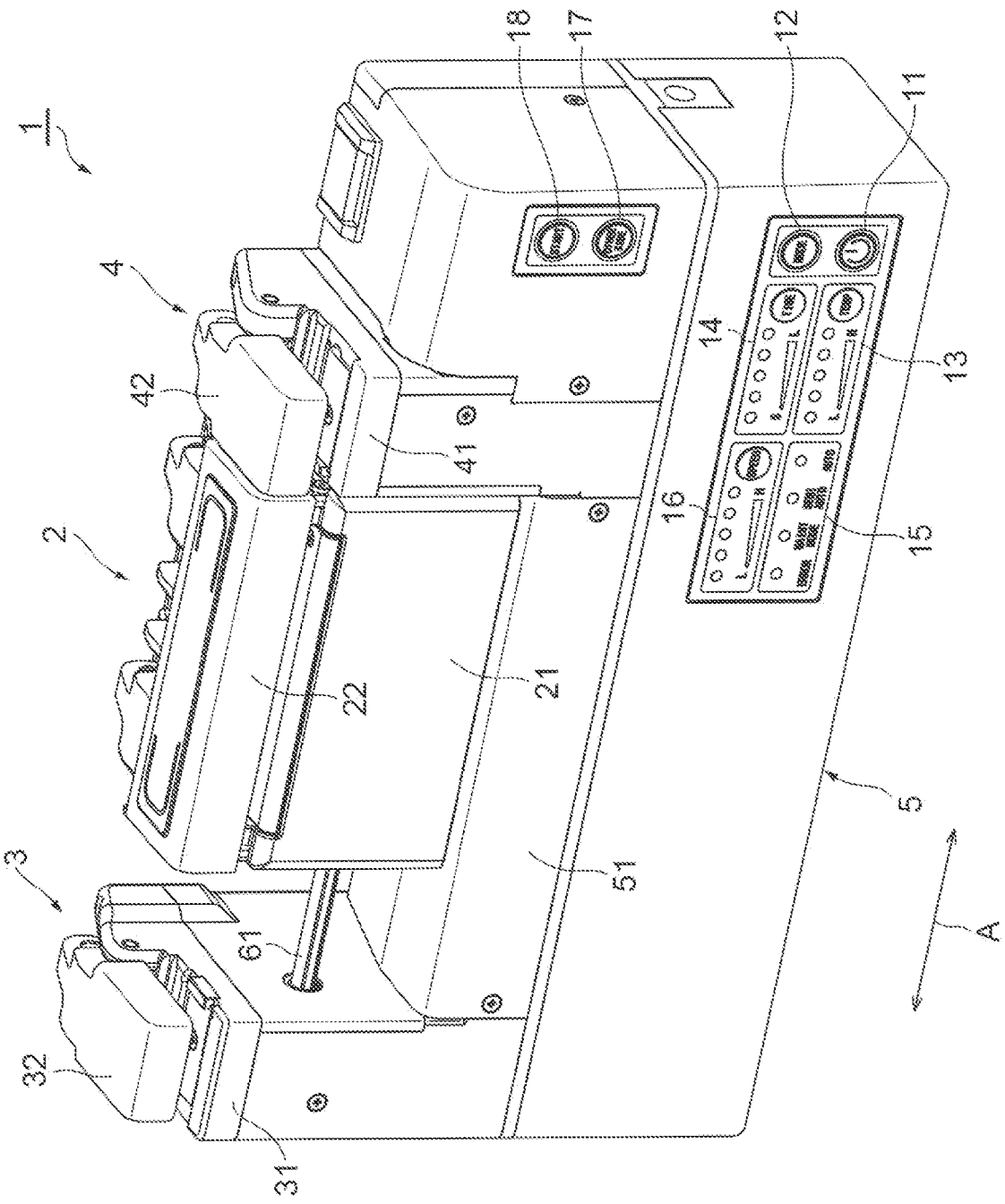
FIG. 1 is a perspective view illustrating an external appearance of a coating removal tool according to one embodiment and illustrates a state in which a lid part of the coating removal tool is closed.

Problems to be Solved by Present Disclosure

When fusion splicing between coated optical fibers is performed, first, resin coatings at distal end portions of coated optical fibers to be connected are removed. Then, distal ends of the coated optical fibers are made to abut each other, and fusion is performed by electric discharges. After the fusion, portions from which the resin coatings have been removed are covered with a resin tube. A coating removal tool is used when the resin coatings at the distal end portions of the coated optical fibers are removed.

In a general coating removal tool, a distal end holding part that holds a distal end portion of a coated optical fiber and a base end holding part that holds a base end portion of the coated optical fiber are configured as separate bodies. In the distal end holding part, a notch is made in a resin coating and the resin coating is heated. Thereafter, the resin coating at the distal end portion is taken out from the coated optical fiber by separating the base end holding part from the distal end holding part. However, when the base end holding part is separated from the distal end holding part, the base end portion of the coated optical fiber held by the base end holding part moves. Therefore, it is necessary for an extra length for work of the coated optical fiber to be increased, and the work tends to be complicated.

Advantageous Effects of Present Disclosure

According to the present disclosure, it is possible to provide a coating removal tool in which movement of a base end holding part is not required and an extra length for work of the coated optical fiber can be reduced.

Description of Embodiments of Present Disclosure

First, details of an embodiment of the present disclosure will be listed and described. A coating removal tool according to one embodiment of the present disclosure removes a portion of a resin coating positioned at a distal end portion of a coated optical fiber from the coated optical fiber having a glass fiber and a resin coating that covers an outer circumference of the glass fiber. The coating removal tool includes a first holding part, a second holding part, and a pedestal part. The first holding part holds the portion of the resin coating positioned at the distal end portion. The second holding part is disposed in an extending direction of the coated optical fiber with respect to the first holding part and holds a base end portion of the coated optical fiber adjacent to the distal end portion. The pedestal part is provided in a direction intersecting the extending direction of the coated optical fiber with respect to the first holding part and the second holding part. The pedestal part supports the first holding part and the second holding part. The first holding part includes a heater for heating the portion of the resin coating positioned at the distal end portion, and a blade for making a notch in a portion of the resin coating positioned at a boundary between the distal end portion and the base end portion. The first holding part is provided to be slidable in the extending direction of the coated optical fiber relative to the pedestal part. The second holding part is fixed relative to the pedestal part.

When this coating removal tool is used, first, the first holding part as a distal end holding part is slid to come closer to the second holding part as a base end holding part. In that state, the coated optical fiber is held by the first holding part and the second holding part. Then, the portion of the resin coating positioned at the distal end portion of the coated optical fiber is heated by the heater. Thereafter, the first holding part is slid to be separated from the second holding part. At this time, since the resin coating has a notch made by the blade and is softened by heating, the resin coating is taken out from the coated optical fiber in accordance with the sliding of the first holding part and is removed from the coated optical fiber. Thereafter, the holding of the coated optical fiber by the first holding part and the second holding part is released.

In this coating removal tool, the second holding part that holds the base end portion of the coated optical fiber is fixed relative to the pedestal part, and the first holding part that holds the distal end portion of the coated optical fiber is slid relative to the pedestal part. Therefore, it is not necessary to move the second holding part serving as the base end holding part, and the base end portion of the coated optical fiber held by the second holding part does not move. Accordingly, an extra length for work of the coated optical fiber can be reduced, and the work can be facilitated.

In the coating removal tool described above, the first holding part and the second holding part may each include a base part and a lid part. The coated optical fiber is placed on the base part. The lid part is provided to be openable and closable with respect to the base part. The first holding part and the second holding part hold the coated optical fiber by sandwiching the coated optical fiber between the base part and the lid part.

The coating removal tool described above may further include a shaft which is rotatable, a first mechanism, and a second mechanism. The shaft penetrates the first holding part and the second holding part in the above-mentioned extending direction. The first mechanism converts a rotation operation of the shaft into opening and closing operations of the lid part of the first holding part. The second mechanism converts the rotation operation of the shaft into opening and closing operations of the lid part of the second holding part.

In the coating removal tool described above, the pedestal part may include a ball screw extending in the extending direction, and the first holding part may include a portion screwed to the ball screw and slide in accordance with rotation of the ball screw.

A coating removal tool according to another embodiment of the present disclosure removes portions of resin coatings positioned at distal end portions of a first coated optical fiber and a second coated optical fiber from the first coated optical fiber and the second coated optical fiber each having a glass fiber and a resin coating that covers an outer circumference of the glass fiber. The coating removal tool includes a first holding part, a second holding part, a third holding part, and a pedestal part. The first holding part holds the portion of the resin coating positioned at the distal end portion of the first coated optical fiber extending from one side in a predetermined direction, or the portion of the resin coating positioned at the distal end portion of the second coated optical fiber extending from another side in the predetermined direction. The second holding part is disposed on one side in the predetermined. direction with respect to the first holding part. The second holding part holds a base end portion of the first coated optical fiber adjacent to the distal end portion. The third holding part is disposed on another side in the predetermined direction with respect to the first holding part. The third holding part holds the base end portion of the second coated optical fiber adjacent to the distal end portion. The pedestal part is provided in a direction intersecting the predetermined direction with respect to the first holding part, the second holding part, and the third holding part. The pedestal part supports the first holding part, the second holding part, and the third holding part. The first holding part includes a heater, a first blade, and a second blade. The heater heats the portions of the resin coatings positioned at the distal end portions of the first coated optical fiber and the second coated optical fiber. The first blade makes a notch in a portion of the resin coating positioned at a boundary between the distal end portion and the base end portion of the first coated optical fiber. The second blade makes a notch in a portion of the resin coating positioned at a boundary between the distal end portion and the base end portion of the second coated optical fiber. The first holding part is provided to be slidable in the predetermined direction relative to the pedestal part. The second holding part and the third holding part are fixed relative to the pedestal part.

When a coating of the first coated optical fiber extending from one side in the predetermined direction is removed, first, the first holding part as a distal end holding part is slid to come closer to the second holding part as a base end holding part. In that state, the first coated optical fiber is held by the first holding part and the second holding part. Then, the portion of the resin coating positioned at the distal end portion of the first coated optical fiber is heated by the heater. Thereafter, the first holding part is slid to be separated from the second holding part. In other words, the first holding part is brought closer to the third holding part. At this time, since the resin coating has a notch made by the blade and is softened by heating, the resin coating is taken out from the first coated optical fiber in accordance with the sliding of the first holding part and is removed from the first coated optical fiber. Thereafter, the holding of the first coated optical fiber by the first holding part and the second holding part is released. When a coating of the second coated optical fiber extending from the other side in the predetermined direction is removed, first, the first holding part as a distal end holding part is slid to come closer to the third holding part as a base end holding part. In that state, the second coated optical fiber is held by the first holding part and the third holding part. Then, the portion of the resin coating positioned at the distal end portion of the second coated optical fiber is heated by the heater. Thereafter, the first holding part is slid to be separated from the third holding part. In other words, the first holding part is brought closer to the second holding part. At this time, since the resin coating has a notch made by the blade and is softened by heating, the resin coating is taken out from the second coated optical fiber in accordance with the sliding of the first holding part and is removed from the second coated optical fiber. Thereafter, the holding of the second coated optical fiber by the first holding part and the third holding part is released.

In this coating removal tool, the second holding part and the third holding part that hold the base end portions of the first and second coated optical fibers are fixed relative to the pedestal part. Further, the first holding part that holds the distal end portions of the first and second coated optical fibers is slid relative to the pedestal part. Therefore, it is not necessary to move the second holding part and the third holding part serving as the base end holding part, and the base end portions of the first and second coated optical fibers held by the second holding part and the third holding part do not move. Accordingly, extra lengths for work of the first and second coated optical fibers can be reduced, and the work can be facilitated. Further, the coating removal tool enables the coating removal in both the first coated optical fiber extending from one side in the predetermined direction and the second coated optical fiber extending from the other side in the predetermined direction. Therefore, the coating removal work can be performed without changing directions of a pair of coated optical fibers to be fused, and a series of work related to fusion can be facilitated. In addition, in this coating removal tool, the second holding part and the third holding part are fixed relative to the pedestal part, and the first holding part positioned between the second holding part and the third holding part is slid. Therefore, a region required for the sliding operation can be made small compared to a case in which the first holding part is fixed and the second holding part and the third holding part are slid. Therefore, the coating removal tool can be compactly configured.

In the above-described coating removal tool, the heater may include a first heating region and a second heating region. The first heating region heats the portion of the resin coating positioned at the distal end portion of the first coated optical fiber. The second heating region is disposed to be aligned with the first heating region in the predetermined direction and heats the portion of the resin coating positioned at the distal end portion of the second coated optical fiber. As described above, even when separate heating regions are used for the first coated optical fiber extending from one side in the predetermined direction and the second coated optical fiber extending from the other side in the predetermined direction, the above-described effects can be obtained.

In the above-described coating removal tool, the heater may include a heating region for heating the portions of the resin coatings positioned at the distal end portions of the first and second coated optical fibers. As described above, the heating region used for the first coated optical fiber extending from one side in the predetermined direction may be used in common with the heating region used for the second coated optical fiber extending from the other side in the predetermined direction. Thereby, the heating region can be made small and the coating removal tool can be miniaturized.

In the coating removal tool described above, the second holding part may include a first detection unit for detecting presence or absence of the first coated optical fiber, and the third holding part may include a second detection unit for detecting presence or absence of the second coated optical fiber. In addition, the coating removal tool may further include a first sensor and a second sensor. The first sensor detects that the first holding part is positioned close to the second holding part. The second sensor detects that the first holding part is positioned close to the third holding part. According to these detection units and sensors, the coating removal tool can recognize a relative position of the first holding part with respect to the second holding part and the third holding part. For example, when the second holding part holds the coated optical fiber and the first holding part is positioned close to the third holding part, the coating removal tool ought not to start a series of operations for removing the coating. Also when the third holding part holds the coated optical fiber and the first holding part is positioned close to the second holding part, the coating removal tool ought not to start a series of operations for removing the coating. According to this coating removal tool, for example, even if an operator mistakenly operates the coating removal tool in those states, a safety function such as not automatically starting a series of operations for removing the coating can be easily realized.

In the coating removal tool described above, the first holding part may include a first base part on which the distal end portion of the first coated optical fiber or the second coated optical fiber is placed, and a first lid part provided to be openable and closable with respect to the first base part. The first holding part holds the distal end portion by sandwiching the distal end portion between the first base part and the first lid part. The second holding part may include a second base part on which the base end portion of the first coated optical fiber is placed, and a second lid part provided to be openable and closable with respect to the second base part. The second holding part holds the base end portion of the first coated optical fiber by sandwiching the base end. portion of the first coated optical fiber between the second base part and the second lid part. The third holding part may include a third base part on which the base end portion of the second coated optical fiber is placed, and a third lid part provided to be openable and closable with respect to the third base part. The third holding part holds the base end portion of the second coated optical fiber by sandwiching the base end portion of the second coated optical fiber between the third base part and the third lid part.

The coating removal tool described above may further include a shaft which is rotatable, a first mechanism, a second mechanism, and a third mechanism. The shaft penetrates the first holding part, the second holding part, and the third holding part in the predetermined direction. The first mechanism converts a rotation operation of the shaft into opening and closing operations of the lid part of the first lid part of the first holding part. The second mechanism converts the rotation operation of the shaft into opening and closing operations of the second lid part of the second holding part. The third mechanism converts the rotation operation of the shaft into opening and closing operations of the third lid part of the third holding part.

In the coating removal tool described above, the heater may be provided between the first blade and the second blade in the predetermined direction.

In the coating removal tool described above, the pedestal part may have a ball screw extending in the predetermined direction, and the first holding part may have a portion screwed to the ball screw and slide in accordance with rotation of the ball screw.

Details of Embodiments of Present Disclosure

Specific examples of a coating removal tool according to the present disclosure will be described below with reference to the drawings. The present invention is not limited to these examples but is indicated by the scope of the claims, and is intended to include all modifications within the meaning and scope equivalent to the scope of claims. In the following description, the same elements are denoted by the same reference numerals in the description of the drawings, and redundant description thereof will be omitted.

Figure 2:
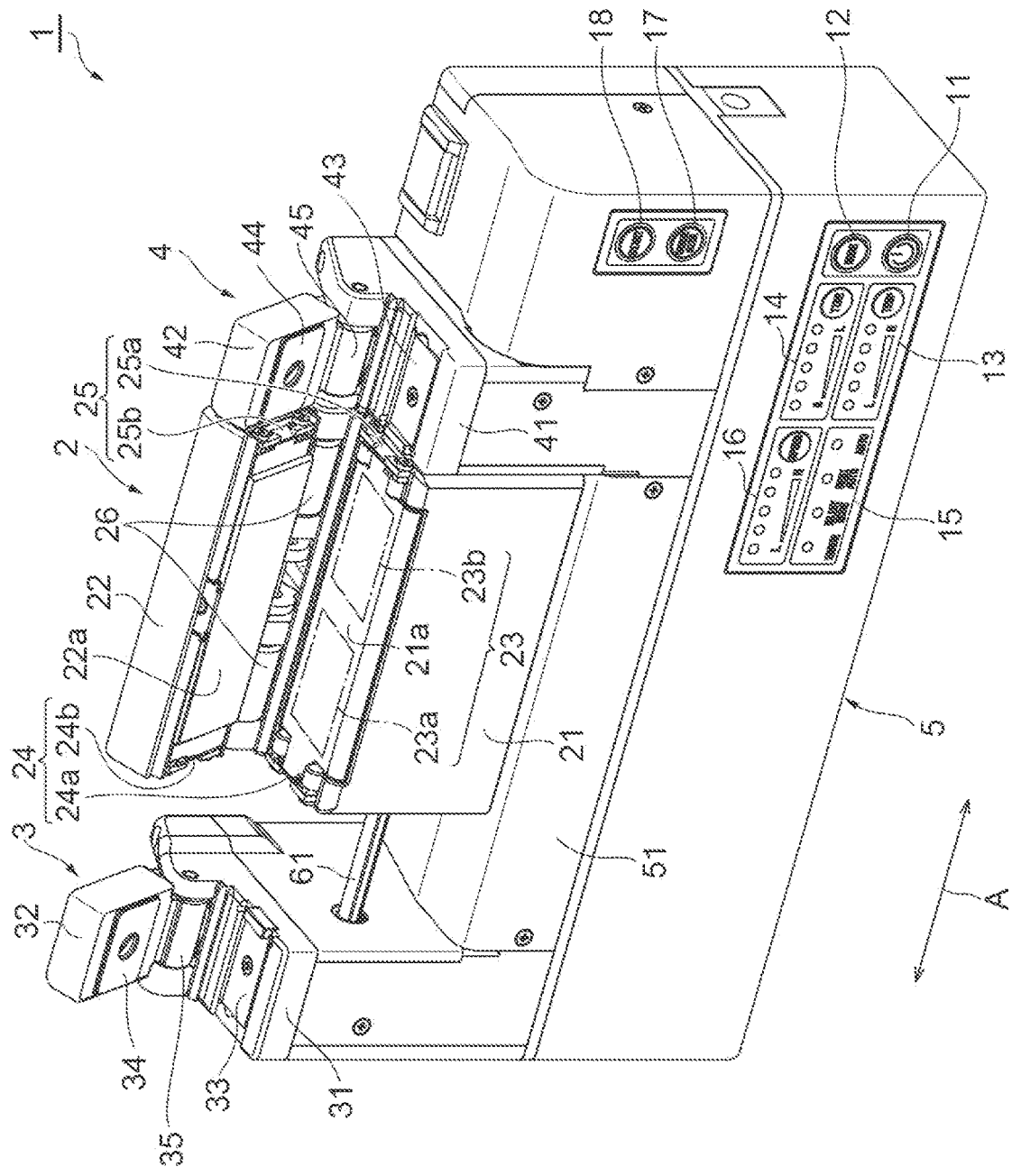
FIG. 2 is a perspective view illustrating the external appearance of the coating removal tool according to one embodiment and illustrates a state in which the lid part of the coating removal tool is open.

FIGS. 1 and 2 are perspective views illustrating an external appearance of a coating removal tool (remover) 1 according to one embodiment of the present disclosure. FIG. 1 illustrates a state in which lid parts 22, 32, and 42 of the coating removal tool 1 are closed. FIG. 2 illustrates a state in which the lid parts 22, 32, and 42 of the coating removal tool 1 are open. As illustrated in FIGS. 1 and 2, the coating removal tool 1 includes a distal end holding part 2, a base end holding part 3, a base end holding part 4, and a pedestal part 5. The distal end holding part 2 is an example of a first holding part in the present disclosure. The base end holding part 3 is an example of a second holding part in the present disclosure. The base end holding part 4 is an example of a third holding part in the present disclosure. The pedestal part 5 is provided in a direction intersecting a predetermined direction A, which is an extending direction of a coated optical fiber, with respect to the distal end holding part 2 and the base end holding parts 3 and 4. The pedestal part 5 is in contact with a work table on which the coating removal tool 1 is installed. The pedestal part 5 functions as a base for supporting the distal end holding part 2 and the base end holding parts 3 and 4. The pedestal part extends in the predetermined direction A.

Figure 3:
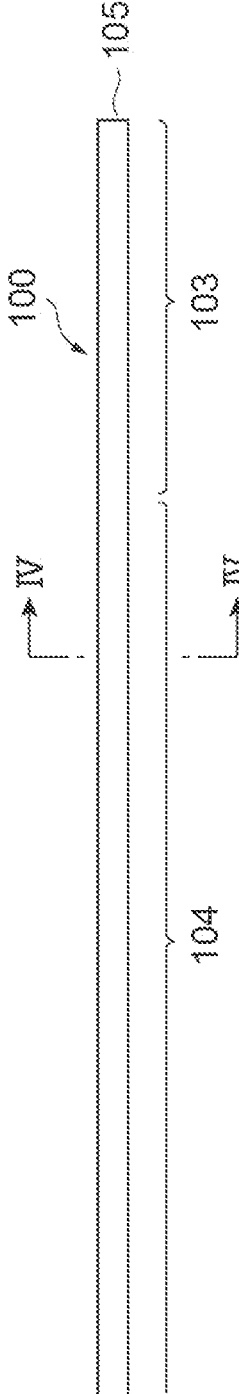
FIG. 3 is a side view of a coated optical fiber.
Figure 4:
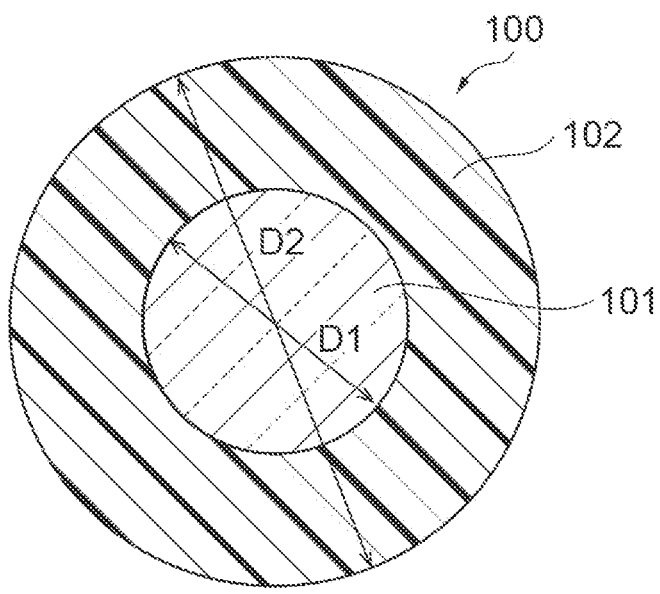
FIG. 4 is a cross-sectional view along line IV-IV of FIG. 3 and illustrates a cross section perpendicular to a central axis of the coated optical fiber.

A coated optical fiber from which a coating is removed will be described. FIG. 3 is a side view of a coated optical fiber 100. FIG. 4 is a cross-sectional view along tine IV-IV of FIG. 3. FIG. 4 illustrates a cross section perpendicular to a central axis of the coated optical fiber 100. The coated optical fiber 100 includes a glass fiber 101 and a resin coating 102 that covers the glass fiber 101. The cross section of the glass fiber 101 is circular. The glass fiber 101 extends along the central axis of the coated optical fiber 100. A diameter D1 of the glass fiber 101 may be, for example, 0.125 mm. A diameter D2 of the resin coating 102 may be, for example, 0.25 mm. The coated optical fiber 100 includes a distal end portion 103 and a base end portion 104. The distal end portion 103 includes a distal end surface 105 and has a certain length. The base end portion 104 is positioned on a base end side of the coated optical fiber 100 with respect to the distal end portion 103 and is adjacent to the distal end portion 103. The coating removal tool 1 illustrated in FIGS. 1 and 2 is a device that removes a portion of the resin coating 102 positioned at the distal end portion 103 of the coated optical fiber 100 from the coated optical fiber 100.

FIGS. 1 and 2 are referred to again. The distal end holding part 2 includes a base part 21 and a lid part 22. The lid part 22 is provided to be operable and closable with respect to the base part 21 by a hinge 26. A shaft 61 is provided to be rotatable, extends in the predetermined direction A, and penetrates the distal end holding part 2 and the base end holding parts 3 and 4 in the predetermined direction A. Opening and closing operations of the lid part 22 are performed via a link mechanism that converts rotational operations of the shaft 61 into the opening and closing operations of the lid part 22. The base part 21 has a surface 21a on which the distal end portion 103 of the coated optical fiber 100 is placed. The lid part 22 has a surface 22a facing the surface 21a. The distal end holding part 2 sandwiches the distal end portion 103 of the coated optical fiber 100 between the surface 21a and the surface 22a in both a case in which the coated optical fiber 100 extends from one side in the predetermined direction A, for example, outside of the base end holding part 3, and a case in which the coated optical fiber 100 extends from the other side in the predetermined direction A, for example, outside of the base end holding part 4. In this way, the distal end holding part 2 holds the resin coating 102 of the distal end portion 103 by sandwiching the distal end portion 103 between the surfaces 21a and the surface 22a.

The distal end holding part 2 includes a pair of blades 24 and a pair of blades 25. The pair of blades 24 are an example of a first blade in the present disclosure. The pair of blades 25 are an example of a second blade in the present disclosure. The pair of blades 24 are disposed close to one end of the distal end holding part 2 in the predetermined direction A. The pair of blades 24 make a notch in a portion of the resin coating 102 positioned at a boundary between the distal end portion 103 and the base end portion 104 in a case in which the coated optical fiber 100 extends from one side in the predetermined direction A, for example, the base end holding part 3 side. The pair of blades 25 (the second blade) are disposed close to the other end of the distal end holding part 2 in the predetermined direction A. The pair of blades 25 make a notch in a portion of the resin coating 102 positioned at a boundary between the distal end portion 103 and the base end portion 104 in a case in which the coated optical fiber 100 extends from the other side in the predetermined direction A, for example, the base end holding part 4 side. The pair of blades 24 includes a lower blade 24a and an upper blade 24b. The lower blade 24a is attached to the base part 21. The upper blade 24b is attached to the lid part 22 and faces the lower blade 24a when the lid part 22 is closed. The lower blade 24a and the upper blade 24b extend along a plane perpendicular to the predetermined direction A with the predetermined direction A as a thickness direction. The lower blade 24a and the upper blade 24b sandwich the coated optical fiber 100 between them to make a notch in the resin coating 102. The pair of blades 25 includes a lower blade 25a and an upper blade 25b. The lower blade 25a is attached to the base part 21. The upper blade 25b is attached to the lid part 22 and faces the lower blade 25a when the lid part 22 is closed. The lower blade 25a and the upper blade 25b extend along a plane perpendicular to the predetermined direction A with the predetermined direction A as a thickness direction. The lower blade 25a and the upper blade 25b sandwich the coated optical fiber 100 between them to make a notch in the resin coating 102. The lower blades 24a and 25a and the upper blades 24b and 25b are made of, for example, a metal. A distance between the lower blade 24a and the upper blade 24b when the lid part 22 is closed, and a distance between the lower blade 25a and the upper blade 25b when the lid part 22 is closed are set so that the lower blades 24a and 25a and the upper blades 24b and 25b can make a notch in the resin coating 102 and do not touch the glass fiber 101.

The distal end holding part 2 further includes a heater 23 for heating the resin coating 102. The heater 23 is configured to include, for example, a heating wire. The heater 23 is provided between the lower blade 24a and the lower blade 25a on the surface 21a of the base part 21. The heater 23 of the present embodiment includes a heating region 23a and a heating region 23b. The heating region 23a is an example of a first heating region in the present disclosure. The heating region 23b is an example of a second heating region in the present disclosure. The heating regions 23a and 23b are disposed to be aligned in the predetermined direction A. The heating region 23a is positioned. between the lower blade 24a. and the heating region 23b. The heating region 23b is positioned between the lower blade 25a and the heating region 23a. The heating region 23a heats the resin coating 102 when the coated optical fiber 100 extends from one side in the predetermined direction A, for example, outside of the base end holding part 3. The heating region 23b heats the resin coating 102 when the coated optical fiber 100 extends from the other side in the predetermined direction A, for example, outside of the base end holding part 4. Supply of power to the heater 23 is controlled by a heater energizing switch. The heater energizing switch is turned on when the lid part 22 is closed with respect to the base part 21 and is turned off when the lid part 22 is open with respect to the base part 21. That is, the heater 23 generates heat when the lid part 22 is closed with respect to the base pail 21.

Figure 5:
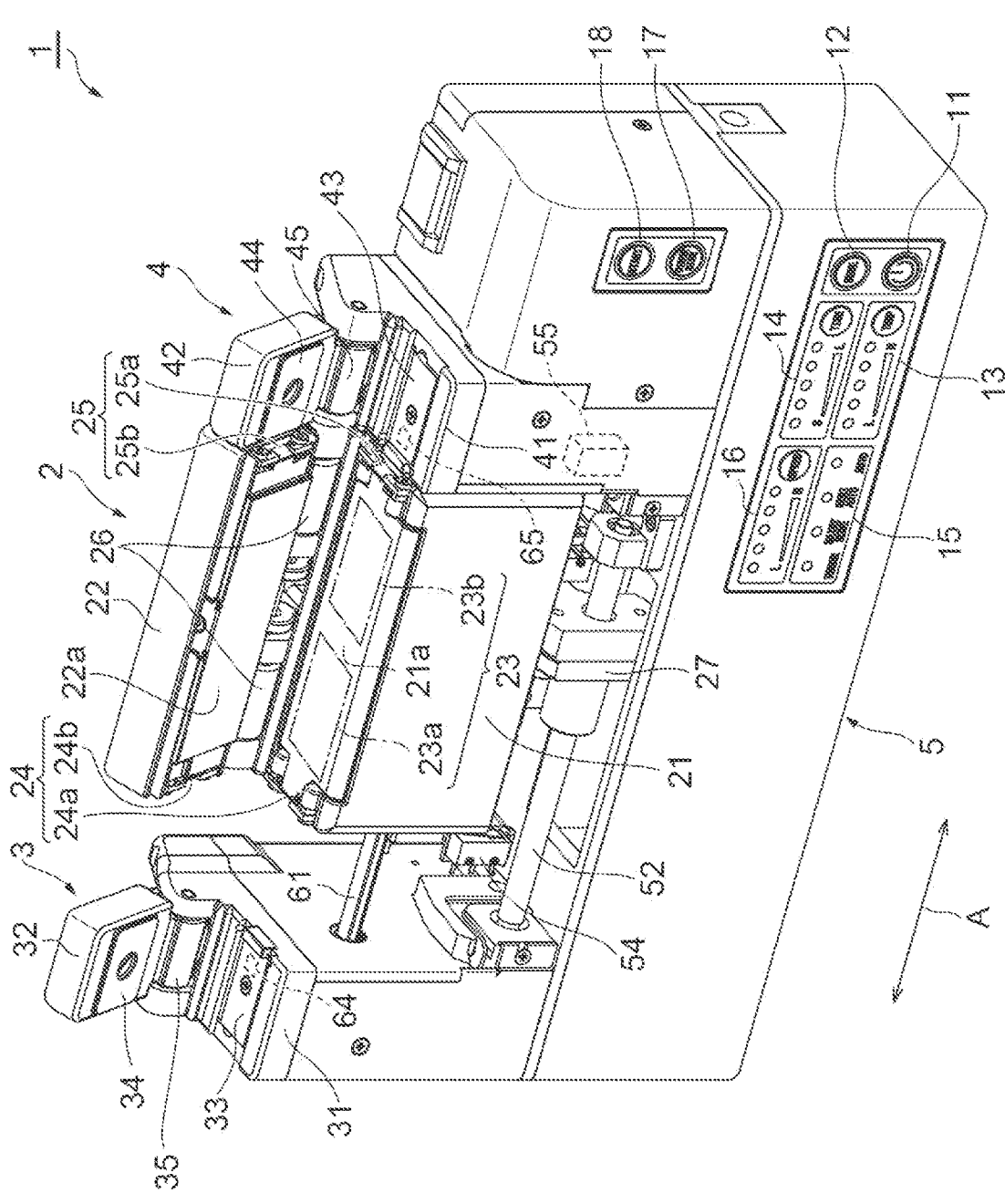
FIG. 5 is a perspective view illustrating a state in which a cover illustrated in FIGS. 1 and 2 is removed.

The distal end holding part 2 is provided to be slidable in the predetermined direction A relative to the pedestal part 5. FIG. 5 is a perspective view illustrating a state in which a cover 51 illustrated in FIGS. 1 and 2 is removed. As illustrated in FIG. 5, the pedestal part 5 includes a ball screw 52 extending in the predetermined direction A. The distal end holding part 2 includes a moving plate 27 screwed to the ball screw 52. The moving plate 27 moves along the ball screw 52 in accordance with rotation of the ball screw 52. That is, when the ball screw 52 rotates in a certain direction, the distal end holding part 2 slides toward the base end holding part 3, in other words, in a direction away from the base end holding part 4. When the ball screw 52 rotates in a direction opposite to that direction, the distal end holding part 2 slides toward the base end holding part 4, in other words, in a direction away from the base end holding part 3. An operation of the ball screw 52 is controlled by a computer incorporated in the coating removal tool 1.

The base end holding part 3 is fixed relative to the pedestal part 5. The base end holding part 3 is disposed to be aligned with the distal end holding part 2 on one side in the predetermined direction A. In other words, when the coated optical fiber 100 extends from one side in the predetermined direction A, the base end holding part 3 is disposed to be aligned with the distal end holding part 2 on the base end side of the coated optical fiber 100 in the extending direction. In that case, the base end holding part 3 holds a portion of the coated optical fiber 100 on the base end side with respect to the distal end portion 103, that is, a part of the base end portion 104. More specifically, the base end holding part 3 holds an optical fiber holder that holds a part of the base end portion 104 of the coated optical fiber 100. The base end holding part 3 includes a holder mounting part 31 on which the optical fiber holder is mounted, and a lid part 32. The lid part 32 is provided to be openable and closable with respect to the holder mounting part 31 by a hinge 35. Opening and closing operations of the lid part 32 are performed via, a link mechanism that converts rotational operations of the shaft 61 into the opening and closing operations of the lid part 32.

A magnet is attached to a lower surface of the optical fiber holder. A metal plate 33 that is coupled to the magnet of the optical fiber holder is provided on a surface of the holder mounting part 31 facing the lid part 32. Thereby, work of mounting the optical fiber holder on the holder mounting part 31 can be facilitated. A rubber plate 34 is attached to a surface of the lid part 32 facing the holder mounting part 31. The base end holding part 3 holds the optical fiber holder mounted on the holder mounting part 31 by sandwiching it between the metal plate 33 of the holder mounting part 31 and the rubber plate 34 of the lid part 32. When a mounting position of the optical fiber holder with respect to the coated optical fiber 100 is adjusted, a length of a portion of the resin coating 102 to be removed can be adjusted.

The base end holding part 4 is relatively fixed to the pedestal part 5. The base end holding part 4 is disposed to be aligned with the distal end holding part 2 on the other side in the predetermined direction A. In other words, when the coated optical fiber 100 extends from the other side in the predetermined direction A, the base end holding part 4 is disposed to be aligned with the distal end holding part 2 on the base end side of the coated optical fiber 100 in the extending direction. In that case, the base end holding part 4 holds a portion of the coated optical fiber 100 on the base end side with respect to the distal end portion 103, that is, a part of the base end portion 104. More specifically, the base end holding part 4 holds an optical fiber holder that holds a part of the base end portion 104 of the coated optical fiber 100. The base end holding part 4 includes a holder mounting part 41 on which the optical fiber holder is mounted, and the lid part 42. The lid part 42 is provided to be openable and closable with respect to the holder mounting part 41 by a hinge 45. An opening/closing operation of the lid part 42 is performed via a link mechanism that converts rotational operations of the shaft 61 into the opening/closing operation of the lid part 42.

A metal plate 43 that is coupled to the magnet of the optical fiber holder is provided on a surface of the holder mounting part 41 facing the lid part 42. Thereby, work of mounting the optical fiber holder on the holder mounting part 41 can be facilitated. A rubber plate 44 is attached to a surface of the lid part 42 facing the holder mounting part 41. The base end holding part 4 holds the optical fiber holder mounted on the holder mounting part 41 by sandwiching it between the metal plate 43 of the holder mounting part 41 and the rubber plate 44 of the lid part 42.

The base end holding part 3 and the base end holding part 4 each include a detection unit for detecting presence or absence of the coated optical fiber 100. Specifically, switches 64 and 65 are provided on a back side of the metal plates 33 and 43 in the holder mounting parts 31 and 41. The switch 64 is an example of a first detection unit in the present disclosure. The switch 65 is an example of the second detection unit in the present disclosure. When the optical fiber holder is mounted on either the holder mounting part 31 or 41, a switch of the holder mounting part on a side on which the optical fiber holder is mounted enters an ON state, and it is detected that the optical fiber holder is placed on the holder mounting part, that is, the coated optical fiber 100 is present on the holder mounting part.

The coating removal tool 1 further includes a sensor 54 and a sensor 55. The sensor 54 is an example of a first sensor in the present disclosure. The sensor 55 is an example of a second sensor in the present disclosure. The sensor 54 is provided at a position close to the base end holding part 3 in the pedestal part 5. When the moving plate 27 comes into contact with the sensor 54, the sensor 54 enters an ON state and detects that the distal end holding part 2 is positioned close to the base end holding part 3. Also, the sensor 55 is provided at a position close to the base end holding part 4 in the pedestal part 5. When the moving plate 27 comes into contact with the sensor 55, the sensor 55 enters an ON state and detects that the distal end holding part 2 is positioned close to the base end holding part 4.

The coating removal tool 1 further includes a power switch 11, a mode switch 12, a distal end holding part moving switch 17, and a removal start switch 18. The coating removal tool 1 further includes a heating temperature indicator 13, a heating time indicator 14, a mode indicator 15, and a speed indicator 16. The power switch 11 is a switch for an operator to turn on or off power of the coating removal tool I. The mode switch 12 is a switch for the operator to switch an operation mode of the coating removal tool 1 such as, for example, an auto mode or a semi-auto mode. The distal end holding part moving switch 17 is a switch for simply moving the distal end holding part 2 from the base end holding part 3 side to the base end holding part 4 side or in a direction opposite to that. The removal start switch 18 is a switch for starting removal of the coating. in a case in which the operation mode is set to the auto mode, when the operator presses the removal start switch 18, a series of operations such as closing operations of the lid parts 22, 32, and 42, heating with the heater 23, and sliding of the distal end holding part 2 are automatically performed. In a case in which the operation mode is set to the semi-auto mode, when the operator presses the removal start switch 18, operations other than the closing operations of the lid parts 22, 32, and 42, that is, heating with the heater 23 and sliding of the distal end holding part 2 are automatically performed.

The heating temperature indicator 13 indicates a current heating temperature set value of the heater 23. The heating temperature set value of the heater 23 can be changed in stages by a switch provided in the heating temperature indicator 13. The heating time indicator 14 indicates a current heating time set value of the heater 23. The heating time set value of the heater 23 can be changed in stages by a switch provided in the heating time indicator 14. The mode indicator 15 indicates a current operation mode. The speed indicator 16 indicates a current moving speed set value of the distal end holding part 2. The moving speed set value of the distal end holding part 2 can be changed in stages by a switch provided in the speed indicator 16.

An operation of the coating removal tool 1 having the above-described configuration will be described. First, the operator operates the distal end holding part moving switch 17 so that the distal end holding part 2 slides to come closer to the base end holding part 3. The operator sets the optical fiber holder on the base end portion 104 of the coated optical fiber 100 (first coated optical fiber) and opens the lid parts 22, 32, and 42. The operator mounts the optical fiber holder on the holder mounting part 31 of the base end holding part 3 and places the distal end portion 103 of the coated optical fiber 100 on the base part 21 of the distal end holding part 2. In this case, the coated optical fiber 100 extends from one side in the predetermined direction A. When the operator operates the removal start switch 18, the lid pails 22, 32, and 42 are closed, and the coated optical fiber 100 is held by the distal end holding part 2 and the base end holding part 3. Then, the portion of the resin coating 102 positioned at the distal end portion 103 of the coated optical fiber 100 is heated by the heating region 23*a* of the heater 23. Thereafter, the distal end holding part 2 is slid to be separated from the base end holding part 3. In other words, the distal end holding part 2 is brought closer to the base end holding part 4. At this time, the resin coating 102 has a notch made by the blade 24 and is softened by heating. Therefore, the portion of the resin coating 102 positioned at the distal end portion 103 of the coated optical fiber 100 is taken out from the coated optical fiber 100 in accordance with the sliding of the distal end holding part 2 and is removed from the coated optical fiber 100. Thereafter, the lid parts 22, 32, and 42 are opened again, and the holding of the coated optical fiber 100 by the distal end holding part 2 and the base end holding part 3 is released. In this way, the coating removal of the coated optical fiber 100 is completed.

Next, the operator sets the optical fiber holder on the base end portion 104 of another coated optical fiber 100 (second coated optical fiber). The operator mounts the optical fiber holder on the holder mounting part 41 of the base end holding part 4 and places the distal end portion 103 of the coated optical fiber 100 on the base part 21 of the distal end holding part 2. In this case, the coated optical fiber 100 extends from the other side in the predetermined direction A. When the operator operates the removal start switch 18, the lid parts 22, 32, and 42 are closed, and the coated optical fiber 100 is held by the distal end holding part 2 and the base end holding part 4. Then, the portion of the resin coating 102 positioned at the distal end portion 103 of the coated optical fiber 100 is heated by the heating region 23*b* of the heater 23. Thereafter, the distal end holding part 2 is slid to be separated from the base end holding part 4. In other words, the distal end holding part 2 is brought closer to the base end holding part 3. At this time, the resin coating 102 has a notch made by the blade 25 and is softened by heating. Therefore, the portion of the resin coating 102 positioned at the distal end portion 103 of the coated optical fiber 100 is taken out from the coated optical fiber 100 in accordance with the sliding of the distal end holding part 2 and is removed from the coated. optical fiber 100. After that, the lid parts 22, 32, and 42 are opened again, and the holding of the coated optical fiber 100 by the distal end holding part 2 and the base end holding part 4 is released. In this way, the coating removal of the coated optical fiber 100 is completed.

Effects obtained by the coating removal tool 1 described above are as follows. In the coating removal tool 1, the base end holding part 3 for holding the base end portion 104 of the coated optical fiber 100 extending from one side in the predetermined direction A and the base end holding part 4 for holding the base end portion 104 of the coated optical fiber 100 extending from the other side in the predetermined direction A are fixed relative to the pedestal part 5. Further, the distal end holding part 2 that holds the distal end portion 103 of the coated optical fiber 100 is slid relative to the pedestal part 5. In this case, the base end holding parts 3 and 4 do not move. In other words, the base end holding parts 3 and 4 are relatively stationary with respect to the installation location of the coating removal tool 1. Therefore, the base end portion 104 of the coated optical fiber 100 held by the base end holding part 3 or the base end holding part 4 does not move. Accordingly, an extra length for work of the coated optical fiber 100 can be reduced, and the work can be facilitated. Further, in the coating removal tool 1, it is possible to remove the coating on both the coated optical fiber 100 extending from one side in the predetermined direction A and the coated optical fiber 100 extending from the other side in the predetermined direction A. Therefore, the coating removal work can be performed without changing directions of a pair of coated optical fibers 100 to be fused, and a series of work related to the fusion can be facilitated. For example, it is possible to perform parallel work such as removing the coating of the other coated optical fiber 100 while setting the coated optical fiber 100 on one side whose coating removal has been completed in a fusion splicer. In addition, in the coating removal tool 1, the base end holding parts 3 and 4 are fixed relative to the pedestal part 5, and the distal end holding part 2 positioned between the base end holding parts 3 and 4 is slid. Therefore, a region required for the sliding operation can be made small compared to a case in which the distal end holding part 2 is fixed and the base end holding parts 3 and 4 are slid. Therefore, the coating removal tool can be compactly configured.

As in the present embodiment, the heater 23 may include the heating region 23*a* and the heating region 23*b*. The heating region 23*a* heats the resin coating 102 of the coated optical fiber 100 extending from one side in the predetermined direction A. The heating region 23*b* is disposed to be aligned with the heating region 23*a* in the predetermined direction A and heats the resin coating 102 of the coated optical fiber 100 extending from the other side in the predetermined direction A. As described above, even when separate heating regions are used for the coated optical fiber 100 extending from one side in the predetermined direction A and the coated optical fiber 100 extending from the other side in the predetermined direction A, the effects of the present embodiment can be obtained.

As in the present embodiment, the base end holding part 3 may include the switch 64 as a detection unit for detecting presence or absence of the coated optical fiber 100 extending from one side in the predetermined direction A. The base end holding part 4 may include the switch 65 as a detection unit for detecting presence or absence of the coated optical fiber 100 extending from the other side in the predetermined direction A. In addition, the coating removal tool 1 may include the sensor 54 and the sensor 55. The sensor 54 detects that the distal end holding part 2 is positioned close to the base end holding part 3. The sensor 55 detects that the distal end holding part 2 is positioned close to the base end holding part 4. According to the switches 64 and 65 and the sensors 54 and 55, the coating removal tool 1 can recognize a relative position of the distal end holding part 2 with respect to the base end holding parts 3 and 4. For example, when the base end holding part 3 holds the coated optical fiber 100 and the distal end holding part 2 is positioned close to the base end holding part 4, the coating removal tool 1 ought not to start a series of operations for removing time coating, Also when the base end holding part 4 holds the coated optical fiber 100 and the distal end holding part 2 is positioned close to the base end holding part 3, the coating removal tool 1 ought not to start a series of operations for removing the coating. According to the coating removal tool 1 of the present embodiment, for example, even if the operator mistakenly operates the coating removal tool 1 in those states, a safety function such as not automatically starting a series of operations for removing the coating can be easily realized.

Modified Example

Figure 6:
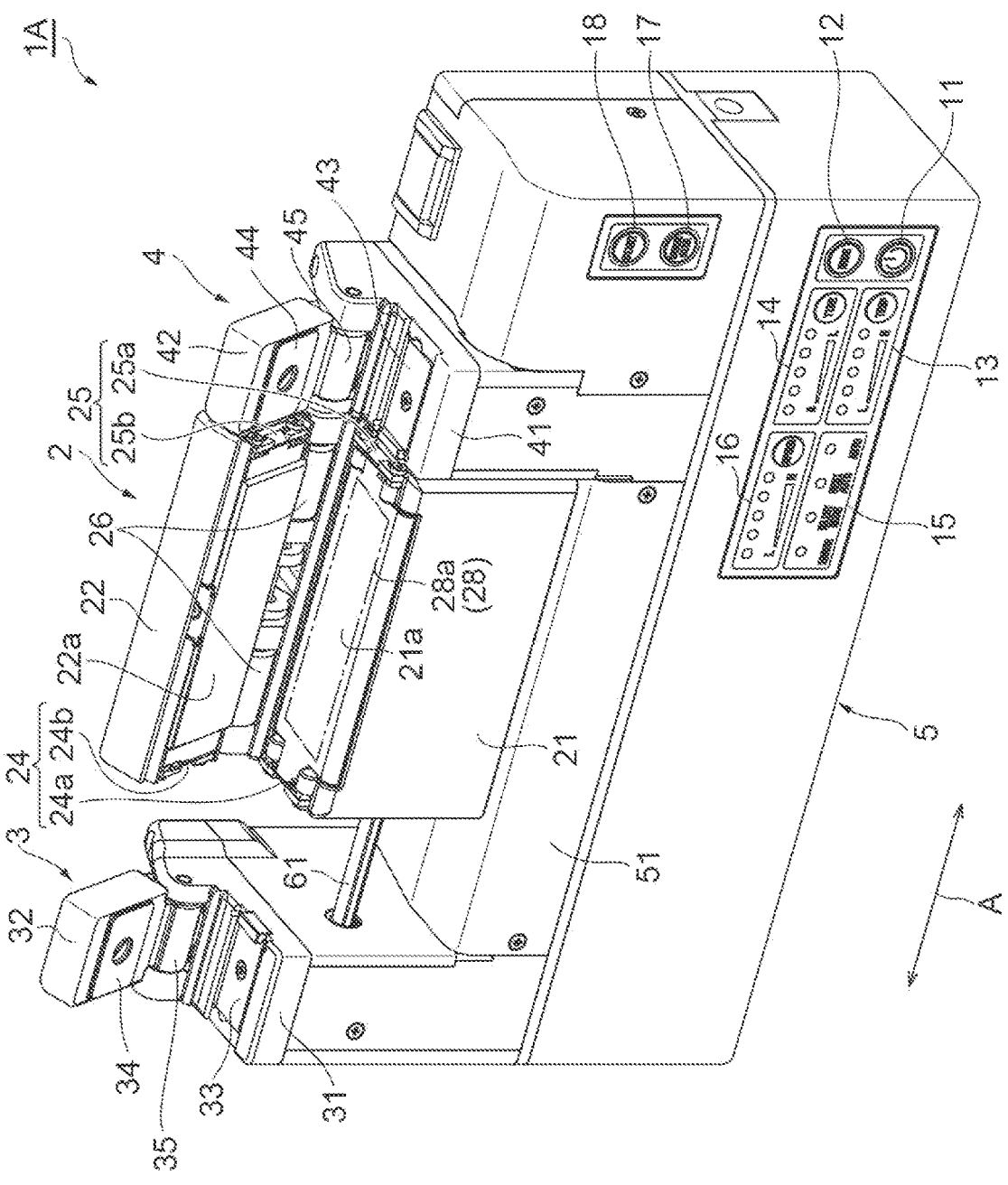
FIG. 6 is a perspective view illustrating an external appearance of the coating removal tool according to one modified example and illustrates a state in which the lid part is open.

FIG. 6 is a perspective view illustrating an external appearance of a coating removal tool 1 A according to one modified example of the above-described embodiment. FIG. 6 illustrates a state in which the lid parts 22, 32, and 42 are open. The present modified example is different from the above-described embodiment in a configuration of the heater of the distal end holding part 2 and is consistent with the above-described embodiment in other configurations. The distal end holding pail 2 of the present modified example includes a heater 28 instead of the heater 23 of the above-described embodiment. The heater 28 includes a heating region 28*a*. The heating region 28*a* heats the resin coating 102 when the coated optical fiber 100 extends from one side in the predetermined direction A. Further, the heating region 28*a* heats the resin coating 102 also when the coated optical fiber 100 extends from the other side in the predetermined direction A. In other words, in the heater 28, the region for heating the resin coating 102 of the coated optical fiber 100 extending from one side in the predetermined direction A is used in common with the region for heating the resin coating 102 of the coated optical fiber 100 extending from the other side in the predetermined direction A.

As in the present modified example, the heating region used for the coated optical fiber 100 extending from one side in the predetermined direction A may be used in common with the heating region used for the coated optical fiber 100 extending from the other side in the predetermined direction A. In this case, a required heating region can be reduced and the coating removal tool can be miniaturized.

The coating removal tool according to the present disclosure is not limited to the above-described embodiment, and various other modifications can be made. For example, the coating removal tool 1 of the above-described embodiment and the coating removal tool 1A of the modified example include two base end holding parts 3 and 4, but the coating removal tool may include only one base end holding part 3 or 4. Also in that case, an extra length for work of the coated optical fiber can be reduced, and the work can be facilitated. In that case, it is sufficient to provide only one blade of the distal end holding part 2 and one heating region of the heater corresponding to the base end holding part 3 or 4.

REFERENCE SIGNS LIST

1, 1A Coating removal tool
2 Distal end holding part
3, 4 Base end holding part
5 Pedestal part
11 Power switch
12 Mode switch
13 Heating temperature indicator
14 Heating time indicator
15 Mode indicator
16 Speed indicator
17 Distal end holding part moving switch
18 Removal start switch
21 Base part
21*a* Surface
22 Lid part
22*a* Surface
23 Heater
23*a*, 23*b* Heating region
25 Blade
24*a*, 25*a* Lower blade
24*b*, 25*b* Upper blade
26 Hinge
27 Moving plate
28 Heater
28*a* Heating region
31, 41 Holder mounting part
32, 42 Lid part
33, 43 Metal plate
34, 44 Rubber plate
35, 45 Hinge
51 Cover
52 Ball screw
54 Sensor
61 Shaft
100 Coated optical fiber
101 Glass fiber
102 Resin coating
103 Distal end portion
104 Base end portion
105 Distal end surface
A Predetermined direction
D1, D2 Diameter

The invention claimed is:

1. A coating removal tool that removes a first resin coating at a first distal end of a first coated optical fiber and a second resin coating at a second distal end of a second coated optical fiber, the first coated optical fiber including a first glass fiber and the first resin coating that covers an outer circumference of the first glass fiber and the second coated optical fiber including a second glass fiber and the second resin coating that covers an outer circumference of the second glass fiber, the coating removal tool comprising:

a first holder that is configured to hold the first distal end of the first coated optical fiber extending from a first side in a predetermined direction, or hold the second distal end of the second coated optical fiber extending from a second side in the predetermined direction;

a second holder that is adjacent to the first holder on the first side and configured to hold a first base end of the first coated optical fiber;

a third holder that is adjacent to the first holder on the second side and configured to hold a second base end of the second coated optical fiber; and a pedestal configured to support the first holder, the second holder and the third holder, wherein the first holder includes:

a heater that is configured to heat the first distal end of the first coated optical fiber and the second distal end of the second coated optical fiber, a first blade that is configured to make a notch in a portion of the first resin coating at a boundary between the first distal end and the first base end of the first coated optical fiber, and a second blade that is configured to make a notch in a portion of the second resin coating at a boundary between the second distal end and the second base end of the second coated optical fiber, the first holder is configured to be slidable along the predetermined direction relative to the pedestal, the second holder and the third holder are fixed relative to the pedestal, the second holder includes a first switch that detects a presence or an absence of the first coated optical fiber, the third holder includes a second switch that detects a presence or an absence of the second coated optical fiber, and the coating removal tool further comprises:

a first sensor that is configured to detect whether the first holder is within a predetermined distance from the second holder, and a second sensor that is configured to detect whether the first holder is within a predetermined distance from the third holder.

2. The coating removal tool according to claim 1, wherein the heater includes:

a first heating region that is configured to heat the first distal end of the first coated optical fiber; and a second heating region disposed to be aligned with the first heating region in the predetermined direction and configured to heat the second distal end of the second coated optical fiber.

3. The coating removal tool according to claim 1, wherein the heater includes a heating region that is configured to heat the first distal end of the first coated optical fiber and the second distal end of the second coated optical fiber.

4. The coating removal tool according to claim 1, wherein the first holder includes a first base on which the first distal end of the first coated optical fiber or the second distal end of the second coated optical fiber is configured to be placed and a first lid provided to be openable and closable with respect to the first base in order to sandwich the first distal end of the first coated optical fiber or the second distal end of the second coated optical fiber between the first base and the first lid, the second holder includes a second base on which the first base end of the first coated optical fiber is configured to be placed and a second lid provided to be openable and closable with respect to the second base in order to sandwich the first base end of the first coated optical fiber between the second base and the second lid, and the third holder includes a third base on which the second base end of the second coated optical fiber is configured to be placed and a third lid provided to be openable and closable with respect to the third base in order to sandwich the second base end of the second coated optical fiber between the third base and the third lid.

5. The coating removal tool according to claim 1, wherein the heater is provided between the first blade and the second blade in the predetermined direction.

6. The coating removal tool according to claim 1, wherein the pedestal includes a ball screw that is configured to extend in the predetermined direction, and the first holder includes a portion screwed to the ball screw and slides in accordance with rotation of the ball screw.

\* \* \* \* \*